United States Patent

Rott et al.

[11] Patent Number: 4,578,116
[45] Date of Patent: Mar. 25, 1986

[54] ORGANOSILICON COMPOUNDS AND TEXTILE FIBER FINISHES CONTAINING THESE

[75] Inventors: Hans Rott; Götz Koerner; Günter Schmidt, all of Essen, Fed. Rep. of Germany

[73] Assignee: Th. Goldschmidt AG, Essen, Fed. Rep. of Germany

[21] Appl. No.: 664,705

[22] Filed: Oct. 25, 1984

[30] Foreign Application Priority Data

Oct. 25, 1983 [DE] Fed. Rep. of Germany ....... 3338663

[51] Int. Cl.$^4$ ................................................ C09D 5/16
[52] U.S. Cl. ............................ 106/18.12; 106/287.16; 528/25; 528/29; 556/446; 556/453; 556/456
[58] Field of Search .................. 556/446, 453, 456; 528/29, 25; 106/18.12, 287.16

[56] References Cited

U.S. PATENT DOCUMENTS 4,172,186  10/1979  Scott et al. ........................... 528/29
4,497,962   2/1985  de Montigny et al. ............. 556/446

Primary Examiner—Melvyn I. Marquis
Attorney, Agent, or Firm—Toren, McGeady, Stanger, Goldberg & Kiel

[57] ABSTRACT

Compounds of the formula

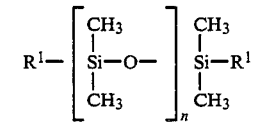

whereby, in the average molecule, 20 to 100% of the $R^1$ radicals are

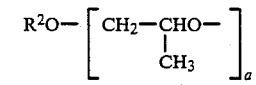

in which $R^2$ is an alkylphenyl, dialkylphenyl or trialkylphenyl radical and the sum of the alkyl carbon atom per phenyl radical is 6 to 12, $a=1$ to 2; and 0 to 80% of the $R^1$ radicals are

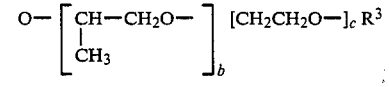

in which $R^3$ is an alkyl radical with 1 to 16 carbon atoms, an organoacyl radical with 1 to 12 carbon atoms, or an aryl radical, $b=1$ to 2, $c=1$ to 30, and $n=3$ to 30, as well as melt spinning finishes comprising 5 to 100 weight percent of the compounds of claim 1, 0 to 90 weight percent of nonpolar or weakly polar oils, 0 to 30 weight percent of nonionic surfactants, 0 to 15 weight percent of ionic surfactants, and optional conventional additives, the sum of the components being 100 weight percent.

6 Claims, No Drawings

ORGANOSILICON COMPOUNDS AND TEXTILE FIBER FINISHES CONTAINING THESE

BACKGROUND OF THE INVENTION

1. Field of the Invention

The invention relates to new organosilicon compounds. It furthermore relates to preparations for treating fibers which contain these new compounds, the preparations being particularly suitable for synthetic fibers obtained from the melt and especially polyester fibers.

2. Description of the Prior Art

Polydimethylsiloxanes are used in spinning mills for finishing melt-spun fibers. This use is possible due to the fact that polydimethylsiloxanes, which are generally referred to herein as silicone oils, impart to the treated fibers a low coefficient of friction which varies little with temperature, even at high take-off speeds. In addition, silicone oils are exceptionally heat stable and have a low viscosity-temperature coefficient.

Finishing of melt-spun yarns immediately after they are produced, enables the subsequent drawing and texturing processes to be carried out. Thus, the finish must be a lubricant as well as an antistat. In thermofixing processes carried out on the yarn, components of the finish are cast onto the heating units where they are subjected to long periods of thermal stress. For this reason, the finish must be thermally stable. It is important that the finish cast on the heating unit not gel, yellow or evaporate; the most important requirement being the resistance to gelling. At the same time, the components of the finish should be compatible with one another. This compatibility is especially a problem in considering the compatibility of the polar, surface-active components, which are primarily responsible for the antistatic activity, with the nonpolar methylsilicone oils which are primarily responsible for the lubricating properties.

The compatibility of methylsilicone oils can be improved by partially replacing the methyl groups with alkyl groups of longer chain length. However, the resulting oils no longer possess sufficient thermal stability. Also, the viscosity-temperature coefficient of such modified methylsilicone oils increases greatly.

The partial replacement of methyl groups with phenyl groups also leads to products of a higher viscosity-temperature coefficient, whose lubricating properties are consequently diminished.

German Pat. No. 26 45 459 discloses textile fiber finishes containing as active components:

1 to 99 weight percent of compounds having the formula

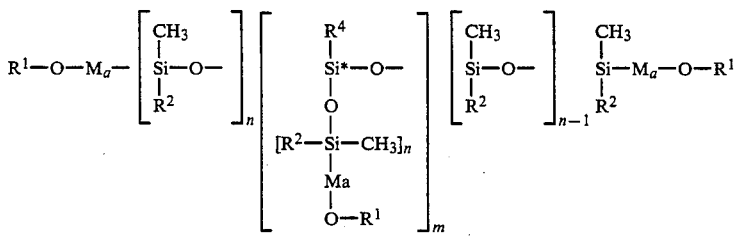

in which
R$^1$ is a mono-, di- or trialkylphenyl radical, in which the sum of the carbon atoms linked in the form of alkyl radicals is at least 6, and at most 12 per phenyl radical, and/or a trimethylsilyl radical;

R$^2$ is an alkyl radical with 1 to 6 carbon atoms, in which the carbon chain can be interrupted by the

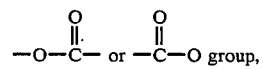

and/or the M$_a$—O—R$^3$ radical, in which
R$^3$ is a mono-, di- or trialkylphenyl radical, the sum of the carbon atoms linked in the form of alkyl radicals being at least 6, and at most 12 per phenyl radical, and/or the

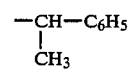

radical;

R$^4$ is an alkyl radical with 1 to 16 carbon atoms and/or

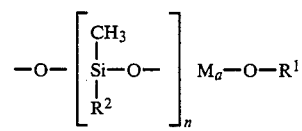

in which
M is an alkylene radical with 1 to 3 carbon atoms,
n has a value of 2.5 to 15,
m has a value of 0 to 5, and
a has a value of 0 or 1,
and the average molecule contains 5 to 30 Si atoms of which no more than 20 mole percent are Si* atoms; and 0.5 to 10 mono-, di- or trialkylphenyl radicals, and 99 to 1 weight percent of known conventional finish components.

These compounds possess high thermal stability and fibers treated with such finishes show excellent frictional properties.

These compounds are related to the compounds of German Pat. No. 26 45 890 having the formula

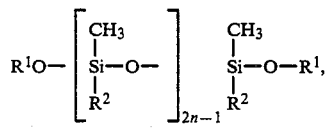

in which

R$^1$ is a mono-, di- or trialkylphenyl radical, the sum of the alkyl carbon atoms per phenyl radical is 6 to 12, and/or the

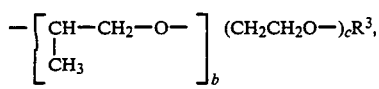

radical, in which
R³ is an alkyl radical with 1 to 16 carbon atoms, and an organoacyl radical with 1 to 12 carbon atoms or an aryl radical,
b has a value of 0 to 2 and
c has a value of 1 to 30,
and/or a trimethylsilyl radical,
R² is a methyl radical,
n has a value of 2.5 to 12.5,
and the average molecule contains 5 to 25 Si atoms and 0.4 to 2.0 mono-, di- or trialkylphenyl radicals, which are linked over Si—O—C bonds directly to Si atoms, and 0.4 to 2.0 polyether blocks.

Melt spin finishes which contain such compounds exhibit improved compatability between the organosilicon compounds and the oils and surfactants, which are usually contained in melt spin finishes. This improved compatability is attributable to the presence of oxyalkylene units in the organosilicon compounds which, however, decreases the thermal stability of the melt spin finishes as compared to that of the compounds of German Pat. No. 26 45 459. It is therefore necessary for each particular application to find the optimum balance between the alkyloxy and oxyalkylene. Therefore, the compounds of German Pat. No. 26 45 890 are used advantageously when a high compatibility with the other additives of the melt spin finish is required and the thermal stress is relatively low.

In the course of the industrial use of melt spin finishes corresponding to German Pat. Nos. 26 45 459 and 26 45 890, it has turned out that such preparations may occasionally show cloudiness and possibly phase separation during use, especially when they remain for a longer periods of time in the vessels used for the finishing process. This cloudiness is observed especially with melt spin finishes containing alkoxylated fatty amines. Such alkoxylated fatty amines are frequently added to melt spin finishes in order to improve the frictional properties of the fibers and to reduce their static charge.

SUMMARY OF THE INVENTION

We have discovered new organosilicon compounds which eliminate this disadvantage and in so doing, improve the compatibility of the organosilicon compounds with other conventional finishing agents, especially with alkoxylated fatty amines. Moreover, the thermal stability exhibited by finishes containing the inventive compounds is no less than that of the compounds of German Pat. Nos. 26 45 459, and 26 45 890.

More particularly, the new organosilicon compounds of the present invention have the formula

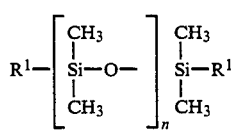

whereby, in the average molecule
20 to 100% of the R¹ radicals are

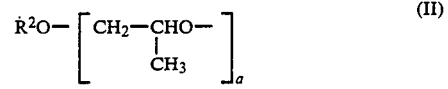

in which
R² is an alkylphenyl, dialkylphenyl or trialkylphenyl radical and the sum of the alkyl carbon atoms per phenyl radical is 6 to 12,
a=1 to 2; and
0 to 80% of the R¹ radicals are

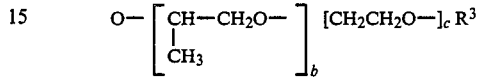

in which
R³ is an alkyl radical with 1 to 16 carbon atoms, an organoacyl radical with 1 to 12 carbon atoms or an aryl radical,
b=1 to 2,
c=1 1 to 30, and
n=3 to 30.

The above-described formula (I) is the average formula of the molar molecule. The R¹ radical can therefore have different meanings; it can however, also represent the same radical.

DESCRIPTION OF THE PREFERRED EMBODIMENT

In those cases where the R¹ radical in the new compounds represents one radical, it represents that shown by formula II. The R² radical is an alkylphenyl radical, the phenyl radical of which has 1, 2 or 3 alkyl substituents, the sum of the alkyl carbon atoms in the phenyl radical being 6 to 12. Preferred alkylphenyl radicals are the nonylphenyl radical and the di-sec.-butylphenyl radical.

The subscript a has a value of 1 to 2.

These compounds are therefore related especially to the compounds of German Pat. No. 26 45 459, especially to the following compound referred to in col. 6, line 30, namely,

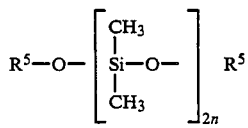

wherein

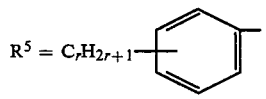

in which
the $C_rH_{2r+1}$-substituent is mainly in the para-position,
r=8 to 12,
n=preferably 5 to 10.

They have approximately the same thermal stability but, in combination with other finishing agents, do not show the aforementioned cloudiness or phase separation.

In the average molecule of formula (I), however, up to 80% of the $R^1$ radicals may be the radical of formula (III). In this case, $R^3$ is an alkyl radical with 1 to 16 carbon atoms, preferably a methyl or butyl radical, an organoacyl radical with 1 to 12 carbon atoms, preferably, an acetyl radical, or an aryl radical, preferably, a nonylphenyl radical.

Subscript b has a value of 1 to 2, and subscript c a value of 1 to 30.

Compounds in which $R^1$ can have different meanings are related to the compounds which are described in German Pat. No. 26 45 890. Therefore, they also have their thermal stability which is decreased relative to that of compounds of German Pat. No. 26 45 459. However, at the same time, such compounds exhibit the improved compatibility which is now also improved towards compounds of the alkoxylated fatty amine type. The new inventive compounds in which $R^1$ consists of the aforementioned mixture of two different radicals, also show no signs of precipitation or phase separation in melt spin finishes.

Thus, the compounds of the present invention have the common property of improved compatibility with other components of melt spin finishes, especially in admixture with alkoxylated fatty amines, while retaining the inherent resistance to temperature stresses of the individual compounds.

The synthesis of the inventive compounds is accomplished by conventional methods known to those skilled in the art. For example, the compound corresponding to U.S. Pat. No. 3,115,512 can be synthesized by reacting equilibrated chlorosiloxanes or chlorosiloxanyl sulfates with propoxylated alkylphenols, optionally in admixture with propoxylated polyoxyalkylene monools. A further known method of synthesizing the inventive compounds is based on the reaction of propoxylated phenols, optionally mixed with polyether monools, with equilibrated hydrogensiloxanes in the presence of suitable catalysts, such as, for example, tin octoate, as described in British Pat. No. 954,041.

The invention furthermore relates to textile fiber finishes, especially melt spinning finishes, which contain the inventive organosilicon compounds (referred to in the following as substances of Group A).

Besides these inventive compounds of Group A, the finishes optionally contain, as members of a Group B, those substances which are nonpolar and advantageously affect the frictional properties, even at very high take-off speeds. This group includes, for example, the so-called ester oils, such as, fatty acid esters of polyols. Representatives of such compounds are trimethylolpropane tripelargonate or esters of monools, such as, hexadecyl stearate, butyl stearate, or oleyl oleate. Dialkyl phthalates can also be described as ester oils, those dialkyl phthalates being of interest, which are derived from branched secondary or primary alcohols. Ester oils derived from aliphatic dicarboxylic acids, are also usable. Mineral oils or liquid, oligomeric polyolefins are cheaper nonpolar finish components. Such finish components are, however, inferior to ester oils in respect to their thermal stability. Hydrophobic polypropylene glycols can also be described as essentially nonpolar components; relative to ester oils. However, they also have disadvantages with respect to thermal stability.

The viscosities (at 20° C.) of the nonpolar or weakly polar oils of this Group B usually are between 5 and 100 cP and preferably, between 10 and 60 cP. Melt spinning finishes frequently contain polar portions which can be divided according to their polarity into compounds of Group C and Group D.

The moderately polar, nonionic components of Group C have the task, for instance, of improving the antistatic activity and, optionally, the compatibility of the nonpolar portions (Group B) with the strongly polar, ionic components (Group D). The latter components are in common use, especially as antistats. Typical representatives of nonionic finishing components are water-soluble or water-dispersible ethylene oxide adducts of fatty acids, fatty alcohols, fatty amines or fatty amines, the liquid, low viscosity representatives of this group being preferred. Especially suitable is $C_{12}H_{25}N(CH_2CH_2OH)_2$, in which the $C_{12}H_{25}$-radical represents a mixture of $C_8H_{17}$-, $C_{10}H_{21}$-, $C_{12}H_{25}$-, $C_{14}H_{29}$, $C_{16}H_{33}$- and $C_{18}H_{37}$-radicals. Moreover, the OH groups may be partially or completely esterified or etherified. Ethylene oxide adducts and esters of fatty acids, such as, glycerol or sorbitol esters, for example, sorbitol monooleate or glycerol trioleate, are also suitable. Ethylene oxide adducts of alkylphenols, such as, for example, nonyl phenol, represent nonionic finishing components which are particularly thermostable. Other polyethylene glycol monoaryl ethers, in which the aryl radical can be a phenyl radical, are also suitable as finishing components which are particularly thermostable.

The strongly polar Group D portions of the finish, which generally consist of liquid organic surfactants having ionic groups, can be anionic, amphoteric or cationic. The compounds have achieved importance above all as antistatic additives. Typical anionic surfactants of this group are the alkali salts of alkyl phosphates or alkyl phosphonates, e.g., Na-octyl-1½-phosphate. In addition, sulfurated mineral oils, fatty alcohol sulfates, or alkyl polyether sulfates are usable. Alkali salts of optionally unsaturated fatty acids also belong to this group. Further representatives of this group are alkali salts of alkylbenzene sulfonates. Typical amphoteric surfactants of this group are the surface active betaines. Cationic surfactants have achieved particular importance as components of melt spinning finishes. Typical representatives of this group are alkyltrimethylammonium sulfate, for example, coconut oil trimethylammonium methosulfate. Particularly suitable is:

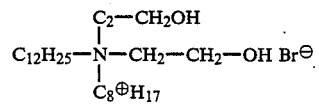

in which the $C_{12}H_{25}$-radical is the statistical average of $C_8$-, $C_{10}$-, $C_{12}$-, $C_{14}$-, $C_{16}$- and $C_{18}$-. Moreover, the Oh groups may be partially or completely esterified or etherified. Because of the low thermal stability of the components of Group D, which have strongly polar ionic groups, and because of their poor compatibility, only the minimum amount that is required of these compounds is taken. Antistatic compounds of Groups C and D are summarized by W. Biedermann, Plaste und Kautschuk, 16, 8–15 (1969) as well as by L. R. Kumar in Silk, Rayon Ind., India 12, 315–333 (1969).

The invention therefore relates to melt spinning finishes comprising:

5 to 100 weight percent of the inventively modified silicone oils of Group A, 0 to 90 weight percent of nonpolar or weakly polar oils of Group B,
0 to 30 weight percent of nonionic compounds of Group C,
0 to 15 weight percent of ionic surfactants of Group D, and optionally conventional additives,
the sum of the components being 100 weight percent.

Depending on the type of application, these substances in the above-described mixture can be used undiluted or diluted in the form of solutions. Preferably, hydrocarbons, conventionally known to be suitable for use in finishes, are used as solvents. They may also be used in the form of emulsions. In the case of emulsions, emulsifiers, with which those skilled in the art are familiar, may also be used. In addition, other additives, such as, oxidation inhibitors, for example, phenols, e.g., dicresyl propane or sodium hypophosphite, which are conventionally used according to the state of the art, may be added.

Compared to the preparations of the state of the art with conventional silicone ethers, the inventive preparations are superior because of a reduced susceptibility to gel or yellow, even when heated to temperatures of 200° C. and above for prolonged periods of time.

On the basis of the good compatibility of the inventively usable silicone polyethers, solvent-free melt spinning finishes, which are self-emulsifying, so that they can easily be washed out, and readily compatible, can be prepared within the limits of the compositions shown. Solvent-free, 100% finishes are preferred over solutions and emulsions, due to their decreased contamination of the environment.

The following examples illustrate the synthesis of inventive compounds, as well as their use of the treatment of fibers.

EXAMPLE 1

A nonylphenyl ether (156.6 g, 0.51 equivalents) having the formula

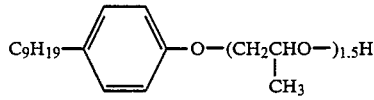

is mixed with 1,400 ml of toluene. While stirring, 300 ml of toluene are then distilled off in order to azeotropically dry the nonylphenyl ether. The contents of the flask are brought to a temperature of 50° C. and mixed with 286.3 g (0.50 equivalents) of a chlorosiloxanyl sulfate, whose idealized average formula is

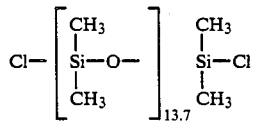

in which a portion of the Cl is replaced by SO$_{4/2}$. The mixture is subsequently stirred for 30 minutes at 50° C. Ammonia is then passed in at the same temperature, until the solution is alkaline. Stirring is then continued for a further 30 minutes under a slight blanket of ammonia, after which time the solution is cooled to below 30° C. An intermediate filtration is now carried out through a filter press covered with a filter layer of cellulose fibers. The polished filtrate is returned to the flask which is evacuated. While stirring vigorously, all the distillate coming over at flask temperatures up to 100° C., is taken off. When no more distillate is obtained, stirring is continued for a further ½ hour under vacuum (20 mm Hg) at a flask temperature of 100° C. The contents of the flask are then cooled to about 30° C. and subsequently aerated. Filtration is repeated through a filter layer of cellulose fibers. The polished product, so produced, has a viscosity (at 20° C.) of 83 cP.

EXAMPLE 2

A nonylphenyl polyether (470.6 g, 0.63 equivalents) of formula

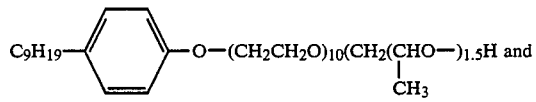

128.9 g (0.42 equivalents) of a nonylphenyl ether of the formula

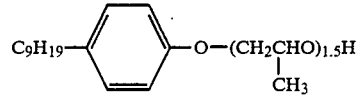

as well as 3,200 ml of toluene are added to a flask. Toluene (650 ml) is then distilled off while stirring. The contents of the flask are brought to a temperature of 50° C. and mixed with 598.5 g (1.0 equivalent) of a siloxane of the formula

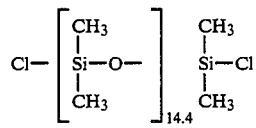

Subsequently, the mixture is stirred for 30 minutes at 50° C. Ammonia is then passed in at the same temperature until the solution becomes alkaline. Stirring is then continued for a further 30 minutes under a slight blanket of ammonia, after which time the solution is cooled to below 30° C. An intermediate filtration through a filter layer of cellulose fibers is now carried out. The polished filtrate is replaced in the flask, which is evacuated. While stirring vigorously, all the distillate coming over at flask temperatures up to 100° C. is taken off. When no more distillate is obtained, stirring is continued for a further ½ hour under vacuum (20 mm Hg) at a flask temperature of 100° C. The contents of the flask are then cooled to about 30° C. and subsequently aerated. Filtration is repeated through a filter layer of cellulose fibers. The polished product, so produced, has a viscosity (at 20° C.) of 240 cP.

In the following tables, compounds 1 to 9, which are not of the present invention, are compared with inventive compounds 10 to 18. Compounds No. 1 and 2 which are not of the invention, show outstanding thermostability. However, when formulated with ethoxylated fatty amines, such as, (C$_{12}$H$_{25}$N(CH$_2$CH$_2$OH)$_2$, cloudiness or phase separation set in after a short time. Compounds 3 and 4, which are not of the invention, show no cloudiness when formulated appropriately with ethoxylated fatty amines; the thermal stability is, however, considerably less than that of compounds 1 and 2. On the other hand, inventive compounds 10 to 14 have both advantages at the same time, they are exceptionally stable thermally and show no signs of phase separation or cloudiness when formulated with ethoxylated fatty amines, such as, for example, $C_{12}H_{25}N(CH_2CH_2OH)_2$. The compatibility of these compounds with white oil or ester oils is also not affected.

The compound No. 5, which is not of the invention and produced analogous to German Pat. No. 2,645,830, is thermally less stable. When formulated with ethoxylated fatty amines, phase separation takes place. On the other hand, the compound according to German Pat. No. 26 45 890 under No. 6, which is not of the invention, shows clearly improved thermal stability; however, the defect of phase separation in formulations with ethoxylated fatty amines remains. The same holds true for compound 7, which is not of the invention. Compounds 8 and 9, which are not of the invention, do not show the defect of phase separation or cloudiness; however, in comparison to compounds 6 or 7, they show a clearly reduced thermal stability. The inventive compounds 15 to 18, once again exhibit both advantages, that is, they are as stable thermally as compounds corresponding to German Pat. No. 26 45 890 and show no phase separation or cloudiness in formulations with ethoxylated fatty amines, such as, $C_{12}H_{25}N(CH_2CH_2OH)_2$. The compatibility of these compounds with white oil or ester oils is also not affected.

TABLE 1

| No. | Product | R¹ | R² | R³ | n | a | b | c |
|---|---|---|---|---|---|---|---|---|
| not according to the invention | | | | | | | | |
| 1 | corresponding to DE-PS 26 45 459 | 100% $R^2O(CH_2CH(CH_3)O—)_a$ | Nonylphenyl- | — | 13.7 | 0 | — | — |
| 2 | according to formula I | 100% $R^2O(CH_2CH(CH_3)O—)_a$ | Nonylphenyl- | — | 11.4 | 0.5 | — | — |
| 3 | according to formula I | 100% $R^2O(CH_2CH(CH_3)O—)_a$ | Nonylphenyl- | — | 11.4 | 2.5 | — | — |
| 4 | according to formula I | 100% $R^2O(CH_2CH(CH_3)O—)_a$ | Nonylphenyl- | — | 11.4 | 3.0 | — | — |
| 5 | according to formula I | 100% $R^3(OCH_2CH_2—)_c(OCH_2CH(CH_3)O—)_b$ | — | Nonylphenyl- | 11.0 | — | 0 | 10 |
| 6 | corresponding to DE-PS 26 45 890 | 40% $R^2O(CH_2CH(CH_3)O—)_a$ 60% $R^3(OCH_2CH_2—)_c(OCH_2CH(CH_3)O—)_b$ | Nonylphenyl- | Nonylphenyl- | 14.4 | 0 | 0 | 10 |
| 7 | according to formula I | 40% $R^2O(CH_2CH(CH_3)O—)_a$ 60% $R^3(OCH_2CH_2—)_c(OCH_2CH(CH_3)O—)_b$ | Nonylphenyl- | Nonylphenyl- | 14.4 | 0.5 | 0.5 | 10 |
| 8 | according to formula I | 40% $R^2O(CH_2CH(CH_3)O—)_a$ 60% $R^3(OCH_2CH_2—)_c(OCH_2CH(CH_3)O—)_b$ | Nonylphenyl- | Nonylphenyl- | 14.4 | 2.5 | 2.5 | 10 |
| 9 | according to formula I | 40% $R^2O(CH_2CH(CH_3)O—)_a$ 60% $R^3(OCH_2CH_2—)_c(OCH_2CH(CH_3)O—)_b$ | Nonylphenyl- | Nonylphenyl- | 14.4 | 3.0 | 3.0 | 10 |
| according to the present invention | | | | | | | | |
| 10 | according to formula I | 100% $R^2O(CH_2CH(CH_3)O—)_a$ | Nonylphenyl- | — | 4 | 1.5 | — | — |
| 11 | according to formula I | 100% $R^2O(CH_2CH(CH_3)O—)_a$ | Nonylphenyl- | — | 11.5 | 1.0 | — | — |
| 12 | according to formula I | 100% $R^2O(CH_2CH(CH_3)O—)_a$ | Nonylphenyl- | — | 11.5 | 1.5 | — | — |
| 13 | according to formula I | 100% $R^2O(CH_2CH(CH_3)O—)_a$ | Nonylphenyl- | — | 11.5 | 2.0 | — | — |
| 14 | according to formula I | 100% $R^2O(CH_2CH(CH_3)O—)_a$ | 2.6-Di-sec.-butylphenyl- | — | 14.5 | 1.5 | — | — |
| 15 | according to formula I | 40% $R^2O(CH_2CH(CH_3)O—)_a$ 60% $R^3(OCH_2CH_2—)_c(OCH_2CH(CH_3)O—)_b$ | Nonylphenyl- | Nonylphenyl- | 13.5 | 1.0 | 1.0 | 10 |
| 16 | according to formula I | 20% $R^2O(CH_2CH(CH_3)O—)_a$ 80% $R^3(OCH_2CH_2—)_c(OCH_2CH(CH_3)O—)_b$ | Nonylphenyl- | $CH_3(CH_2)_{11}$— | 24 | 1.5 | 1.5 | 22 |
| 17 | according to formula I | 40% $R^2O(CH_2CH(CH_3)O—)_a$ 60% $R^3(OCH_2CH_2—)_c(OCH_2CH(CH_3)O—)_b$ | Di-isopropylphenyl- | $CH_3(CH_2)_{10}$—CO— | 14 | 1.5 | 1.5 | 9 |
| 18 | according to formula I | 40% $R^2O(CH_2CH(CH_3)O—)_a$ 60% $R^3(OCH_2CH_2—)_c(OCH_2CH(CH_3)O—)_b$ | Nonylphenyl- | $CH_3$— | 14 | 1.5 | 1.5 | 10 |

TABLE 2

| No. | Viscosity 20° C. cP | Gelling Time hr. at 200° C. | Compatibility (25 wt. % active substance, 7% wt. % white oil or ester oil) | | Stability of a Mixture of 80 wt. % $C_{12}H_{25}N(CH_2CH_2OH)$ and 20 wt. % active substance after number of days | | | |
|---|---|---|---|---|---|---|---|---|
| | | | White oil 5° E | Pentaerythitol tetrapelargonate | 0 | 3 | 7 | 28 |
| not according to the invention | | | | | | | | |
| 1 | 45 | >200 | clear | clear | clear | cloudy | sep.* | sep. |
| 2 | 78 | >100 | clear | clear | clear | clear | cloudy | sep. |
| 3 | 85 | 24 | clear | clear | clear | clear | clear | clear |
| 4 | 90 | 24 | clear | clear | clear | clear | clear | clear |
| 5 | 286 | 7 | clear | clear | clear | cloudy | sep. | sep. |

TABLE 2-continued

| No. | Viscosity 20° C. cP | Gelling Time hr. at 200° C. | Compatibility (25 wt. % active substance, 7% wt. % white oil or ester oil) White oil 5° E | Compatibility Pentaerythitol tetrapelargonate | Stability of a Mixture of 80 wt. % $C_{12}H_{25}N(CH_2CH_2OH)$ and 20 wt. % active substance after number of days 0 | 3 | 7 | 28 |
|---|---|---|---|---|---|---|---|---|
| 6 | 176 | 48 | clear | clear | clear | cloudy | sep. | sep. |
| 7 | 183 | 48 | clear | clear | clear | clear | cloudy | sep. |
| 8 | 188 | 7 | clear | clear | clear | clear | clear | clear |
| 9 according to the invention | 190 | 6 | clear | clear | clear | clear | clear | clear |
| 10 | 170 | >100 | clear | clear | clear | clear | clear | clear |
| 11 | 93 | >100 | clear | clear | clear | clear | clear | clear |
| 12 | 95 | >100 | clear | clear | clear | clear | clear | clear |
| 13 | 90 | >100 | clear | clear | clear | clear | clear | clear |
| 14 | 88 | >100 | clear | clear | clear | clear | clear | clear |
| 15 | 240 | 15 | clear | clear | clear | clear | clear | clear |
| 16 | 510 | 14 | clear (with heating) | clear (with heating) | | | | |
| 17 | 140 | 12 | clear | clear | clear | clear | clear | clear |
| 18 | 140 | 12 | clear | clear | clear | clear | clear | clear |

*sep. = phase separation

We claim:

1. Compound of the formula

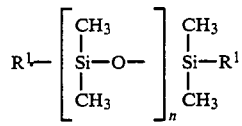

whereby, in the average molecule 20 to 100% of the $R^1$ radicals are

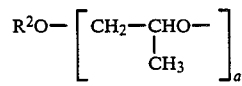

in which
$R^2$ is an alkylphenyl, dialkylphenyl or trialkylphenyl radical and the sum of the alkyl carbon atoms per phenyl radical is 6 to 12,
a = 1 to 2; and
0 to 80% of the $R^1$ radicals are

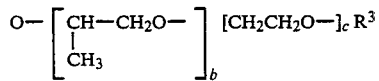

in which
$R^3$ is an alkyl radical with 1 to 16 carbon atoms, an organoacyl radical with 1 to 12 carbon atoms or an aryl radical,
b = 1 to 2,
c = 1 to 30, and
n = 3 to 30.

2. The compound of claim 1 wherein $R^2$ is nonylphenyl or di-sec.-butylphenyl.

3. The compound of claim 1 wherein $R^3$ is selected from the group consisting of methyl, butyl, acetyl, and nonylphenyl.

4. A melt spinning finish comprising
5 to 100 weight percent of the compounds of claim 1,
0 to 90 weight percent of nonpolar or weakly polar oils,
0 to 30 weight percent of nonionic surfactants,
0 to 15 weight percent of ionic surfactants,
the sum of the components being 100 weight percent.

5. A melt spinning finish comprising
5 to 100 weight percent of the compounds of claim 2,
0 to 90 weight percent of nonpolar or weakly polar oils,
0 to 30 weight percent of nonionic surfactants,
0 to 15 weight percent of ionic surfactants,
the sum of the components being 100 weight percent.

6. A melt spinning finish comprising
5 to 100 weight percent of the compounds of claim 3,
0 to 90 weight percent of nonpolar or weakly polar oils,
0 to 30 weight percent of nonionic surfactants,
0 to 15 weight percent of ionic surfactants,
the sum of the components being 100 weight percent.

* * * * *